July 6, 1943.  W. M. HYLAND  2,323,604
BALL BEARING EQUALIZING TABLE SLIDE
Filed Oct. 7, 1940  2 Sheets-Sheet 1

INVENTOR.
WILLIAM M. HYLAND.
BY
Munn, Anderson & Riddy
ATTORNEYS.

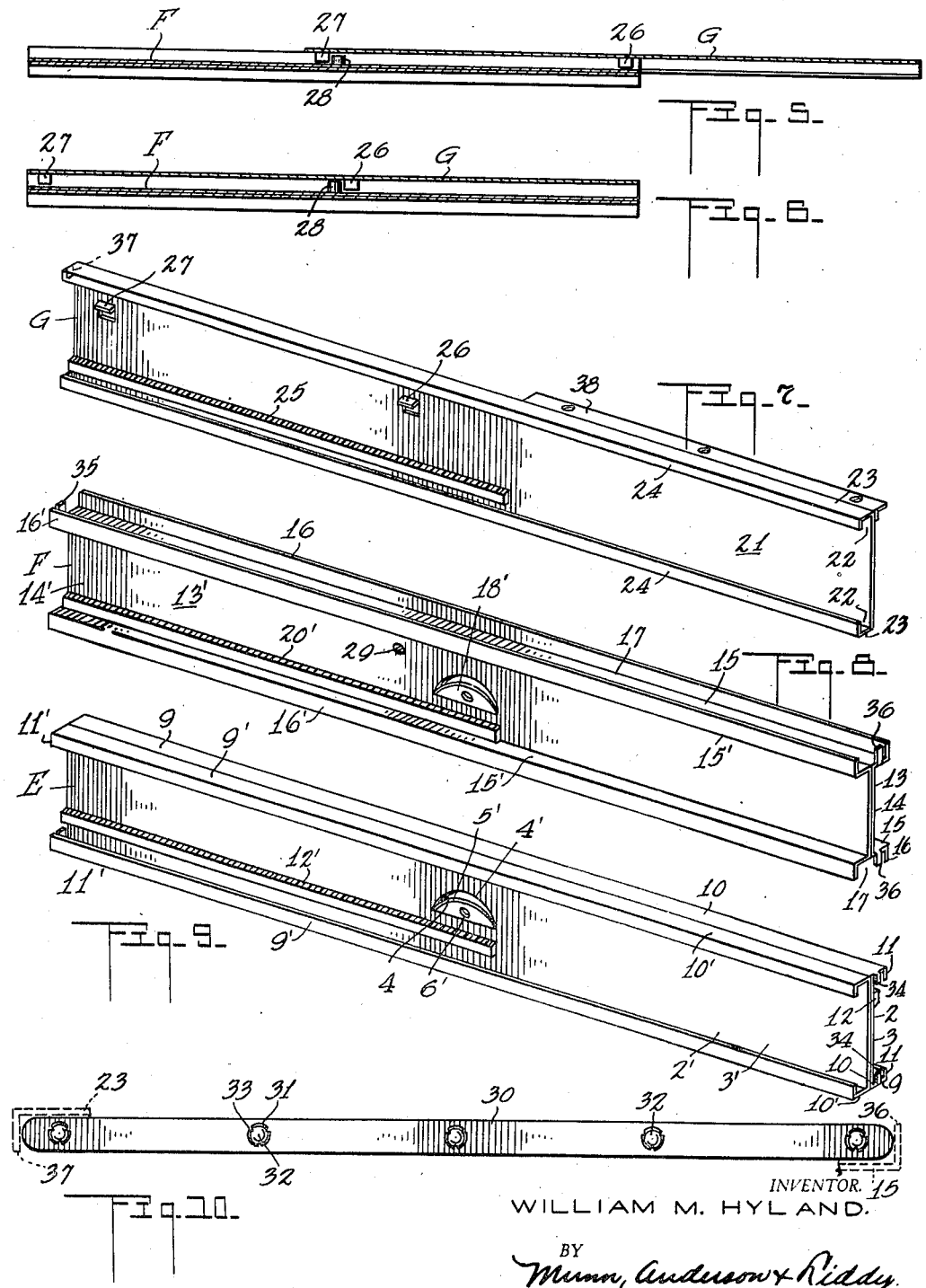

Patented July 6, 1943

2,323,604

UNITED STATES PATENT OFFICE 2,323,604

BALL BEARING EQUALIZING TABLE SLIDE

William M. Hyland, Flint, Mich.

Application October 7, 1940, Serial No. 360,040

8 Claims. (Cl. 311—73)

The present invention relates to improvements in a ball bearing equalizing table slide, and it consists of the combinations, constructions and arrangements hereinafter described and claimed.

An object of my invention is to provide a ball bearing equalizing table slide, in which the equalizing means is housed within the slides instead of being exposed on the outside of the slides. The stops for limiting the opening and closing of the slides are also housed within the slides.

A further object of my invention is to provide a device of the type described in which adjacent slides are slidably connected along their longitudinal edges. The connecting means provide housings for ball bearings, whereby the slides are frictionlessly interconnected. The ball bearing housings also constitute closures between adjacent slides and these cooperate with the slides for entirely enclosing the slide equalizing means.

A still further object of my invention resides in the provision of a table slide which lends itself admirably to stamping the parts out of sheet metal, or forming them from molded plastics. The central and end slides are constructed from the same stamping and the intermediate slides are fashioned from another stamping. In other words, two different stampings can be used for providing a table slide of three or more parts. An equalized slide assembly is always composed of an odd number of slides. I have illustrated five slides in the drawings, although any other odd number may be used.

The particular construction of the slides furnishes an assembly that is light in weight, yet strong and durable for the purpose intended. The ball bearings cause the slides to move easily without friction or any binding action. All of the operating parts of the slides are housed within the slide assembly and hidden from view.

Other objects and advantages will appear as the specification proceeds, and the novel features of my invention will be particularly set forth in the claims hereunto appended.

My invention is illustrated in the accompanying drawings, forming part of this application, in which.

Figures 3, 4:
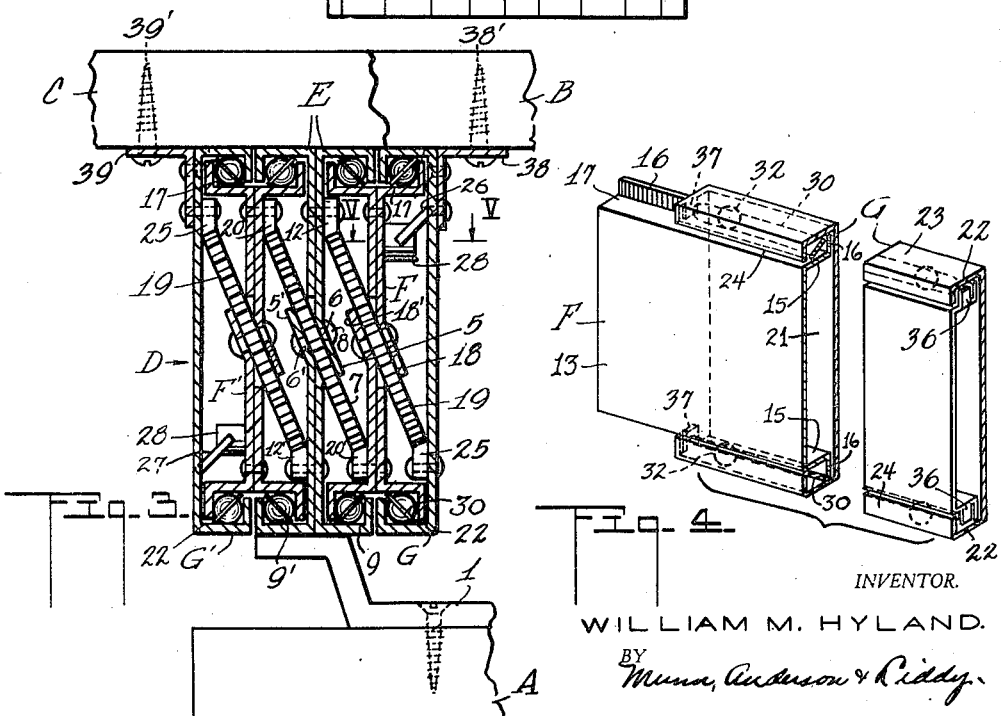
Figure 3 is an enlarged transverse sectional view taken along the line III—III of Figure 2.

Figure 4 an isometric view of a portion of one of the outermost slides and the slide mating therewith, parts being shown in section;

Figure 5 a horizontal section through the same two slides and illustrates the stops for limiting the open and closed positions of the slides, this view depicting the open position;

Figure 6 a view similar to Figure 5, but with the slides in closed position;

Figure 7 an isometric view of one of the end or outermost slides;

Figure 8 an isometric view of an intermediate slide;

Figure 9 an isometric illustration of the center or fixed slide of the assembly; and Figure 10 a plan view of a ball bearing carrier that I make use of in my table slide.

While I have shown only the preferred form of my invention, it should be understood that various changes or modifications may be made without departing from the scope of the claims hereunto appended without departing from the spirit of the invention.

Figure 1:
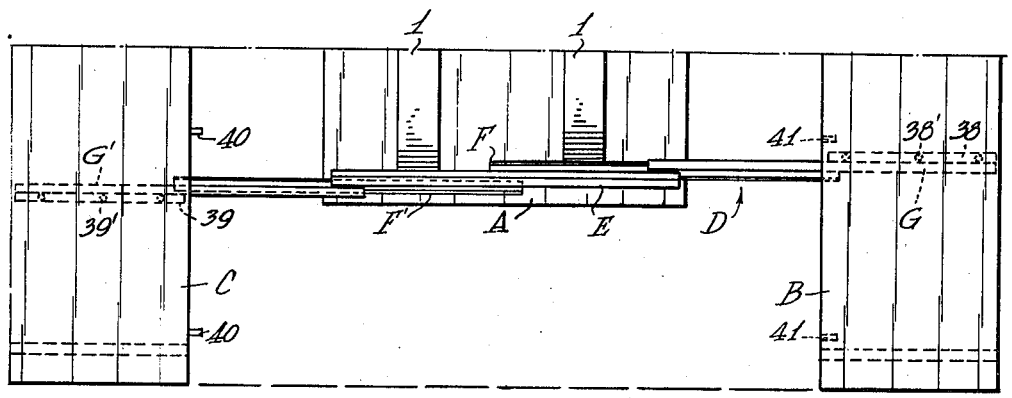
Figure 1 is a top plan view of the table slide assembly in open position and attached to a table base and top end leaves.

In carrying out my invention, I make use of a table base indicated generally at A in Figures 1 and 3 and table top end sections B and C. The slide assembly, indicated generally at D, is secured to the base A by supports 1 in the manner hereinafter described and movably connects the table top sections to the base. The drawings illustrate only one slide assembly, which is disposed to one side of the center line in Figures 1 and 2, and it will be understood that in actual practice two slide assemblies will be used with each table.

I will now describe the slide assembly in detail. In Figures 3 and 9 I show the central slide E, Figure 3 illustrating the slide in transverse section and Figure 9 disclosing the slide in isometric. This slide is made up of two identical parts 2 and 2'. Each part is C-shaped in cross section and the backs or webs 3 and 3' are secured together by any suitable fastening means, such as welding, riveting, etc. Midway between the ends of the central slide E, the webs 3 and 3' are provided with arcuate cuts 4 and 4', and the arcuate cut portions 5 and 5' are bent at the angle indicated (see Figure 3).

The bent portions 5 and 5' have openings 6 and 6', which are aligned with each other when the two parts 2 and 2' are secured together. An equalizing gear 7 is moved into the slot formed by the bent arcuate portions 5 and 5', and a stub shaft or rivet 8 is passed through a center opening in the gear when this opening is aligned with the openings 6 and 6'. The ends of the stub shaft 8 may be upset or otherwise secured to the inclined portions 5 and 5'.

The remaining structure of the central slide E will be described before setting forth the function of the gear 7. The part 2 of the slide has inwardly facing channels 9—9, and in a like manner the part 2' has inwardly facing channels 9'—9'. The channels have horizontal portions 10—10 and 10'—10' and side flanges 11—11 and 11'—11', respectively. Racks 12 and 12' are riveted or otherwise secured to the parts 2 and 2' and extend in opposite directions from the center of the slide as indicated in Figure 9.

It will be noted that the central slide E is especially adapted to being stamped out from sheet metal of the proper gage. Both parts 2 and 2' are identical and they are merely inverted and placed back to back to form the slide as shown. A molded slide would also function properly.

Two intermediate slides F and F' are arranged on opposite sides of the central slide E. Since both are identical, a description of one will suffice and corresponding reference numerals will be applied to like parts. The slide F is illustrated in detail in Figures 3 and 8, and is composed of two identical parts or halves 13 and 13'. Part 13 has a web portion 14 and outwardly facing angles formed of horizontal portions 15—15 and outwardly extending flanges 16—16 that lie parallel to the web 13. The half 13' has similar portions and these are given like reference numerals and primed. When the two halves or parts are secured together, the outwardly facing angles 15—15' will form an outwardly facing channel of slightly more than twice the width of the channels 9.

In assembling the intermediate slides F and F' on the central slide E, the slides F and F' are inserted from opposite ends of the central slide and are moved into place so that the flanges 16' of the slide F will be received in the channels 9 of the central slide and the flanges 16 of the slide F' will be received in the channels 9'. The channels 9 and 9' will occupy only one-half the width of the channels 17 of the slides F and F'.

The webs 14 and 14' receive arcuate cuts and the portions 18 and 18' thus provided are bent outwardly to form an inclined slot for rotatably receiving an equalizing gear 19. The gear 19 of the slide F meshes with the rack 12 of the central slide E, while the gear 19 of the slide F' meshes with the rack 12' of the central slide. The part 14' of the slide F has a rack 20' meshing with the equalizing gear 7 and the slide F' has a rack 20 on the part 14 that meshes with a diametrically-opposed portion of the same gear 7.

Two end or outermost slides G and G' are mounted alongside of the intermediate slides F and F'. Each end slide is identical with the other, and a description of the end slide G will suffice for both and corresponding reference numerals will be used to designate like parts on the two end slides. The end slide G is shown in Figures 3 and 7, and in reality this slide is similar to the part 2 or 2' of the central slide E. This reduces the cost of manufacture, since one die will form a part that can be used for one-half of the central slide or the entire end slide, and a second die will form one-half of the intermediate slide.

The end slide G has a web portion 21 formed with inwardly facing channels 22 that are similar to the channels 9. The channels 22 have horizontal portions 23 and inwardly extending flanges 24. When assembling the end slide G on the intermediate slide F, the flanges 16 are received in the channels 22 and the flanges 24 are received in the channels 17. The flanges 16 are slightly spaced from the web 21 and the horizontal portions 23, while the flanges 24 are spaced slightly from the horizontal portions 15 and from the flanges 11. The end slide G' is assembled on the intermediate slide F' in the same manner and needs no further description.

The end slides G and G' carry racks 25 that are secured thereto in any suitable manner and mesh with the gears 19 carried by the intermediate slides F and F'. The slide G has two stops 26 and 27 (see Figures 5, 6 and 7) that in reality are inwardly bent parts of the web 21. The intermediate slide F has a block 28 that is secured thereto by a screw 29 (see Figure 8). The block moves between the stops 26 and 27 to limit the open and closed positions of the slides. In a like manner, the slide G' has stops (see Figure 3) that strike a block 28 carried by the intermediate slide F'. The blocks 28 and screws 29 are secured to the intermediate slides F and F' after all of the slides have been partially assembled, and moved into a position where the blocks are disposed between the stops.

The cooperating channels in the adjacent slides form housings for ball bearings. The ball bearings may be loosely arranged in the housings, or mounted in carriers. In Figure 10, I have illustrated ball bearings mounted in a carrier 30. This carrier is in the form of an elongated strip with spaced openings 31 for receiving ball bearings 32. Any means desired may be used for securing the ball bearings to the strip, and I have indicated ball-retaining prongs or fingers 33 that are integral with the strip and bent outwardly on both sides of the strip for receiving and rotatably holding the ball bearings in place. In the drawings, I have indicated three prongs on one side of the strip, and it will be understood that three prongs are arranged on the opposite side of the strip.

The carriers with their ball bearings are placed in the housings formed by the channels 9—9 of the central slide E and 17—17 of the intermediate slide F, and also by the channels 9'—9' of the central slide E and the channels 17—17 of the other intermediate slide F'. This will frictionlessly connect the intermediate slides to the central slide. In a like manner, additional carriers and ball bearings are placed in the housings formed by the channels 17—17 of the intermediate slide F and the channels 22—22 of the end slide G, and the housings formed by the channels 17—17 of the other intermediate slide F' and the channels 22—22 of the other end slide G'. This will connect the two intermediate slides F and F' with the two end slides G and G', respectively.

It will be noted from Figure 3 that the strips 30 are inclined at an angle in the housings and that the ball bearings contact with four walls of the housings. In this way the ball bearings prevent the edges of the flanges from contacting with the bottoms of the cooperating channels. The ball bearings also prevent transverse movement of the slides either toward or away from each other by contacting with the inner surfaces of the flanges. The gearing and racks hold the slides from moving transversely toward each other. The only points of contact between adjacent slides, therefore, is through the ball bearings and the gears and racks. The ball bearings will carry the weight imposed on the slides and permit frictionless moving without any binding action.

I provide means for holding the ball bearing carriers in the housings. I accomplish this by closing the ends of certain of the channels. For example, the channels 9—9 of the central slide E have portions 34—34 (see Figure 9) bent to close the ends of the channels through which the intermediate slide F will move when the slide is extended. The portions 34—34 are spaced from the web 3 in order to permit the flanges 16'—16' of the intermediate slide channel 17 to move therethrough when the slide is extended. The portions 34—34 will close one end of the ball bearing housings. The other end of the same housing will be closed by portions 35—35 (see Figure 8) disposed at the ends of the channels 17—17 opposite the portions 34—34 and extending substantially across one-half the widths of the double channels 17—17. The portions 35—35 hold the ball bearing carriers in the housings, while permitting the flanges 11—11 to move thereby. The lengths of the ball bearing carriers is substantially equal to the lengths of the overlapping distance of the slides E and F when the slide F is fully extended.

It will be noted from Figure 8 that the opposite ends of the channels 17—17 from the portions 35—35 are provided with portions 36—36, and the latter close one end of each of the ball bearing housings that interconnect the slides F and G. The ends of the channels 22—22 in the end slide G disposed opposite to the portions 36—36 have portions 37—37 (see Figure 7) closing the other ends of the housings. The portions 37—37 leave slots adjacent to the web 21 for the passage of the flanges 16—16.

In order to clear up the construction of the stops 36—36 and 37—37 still further, I have illustrated them in the isometric view in Figure 4. One-half of the intermediate slide F is depicted and the end slide G is fully extended. Portions 36 and 37 are also indicated by dotted lines in Figure 10 and give their approximate position with respect to the ball bearing carrier when the slide is fully extended. The housings for the slides F' and G' are constructed with stop portions in the same manner and further description need not be given.

The central slide E of each slide group D is welded or otherwise secured to the upstanding portions of the supports 1 (see Figures 1 and 3). The end slides G and G' are secured to their respective table top sections B and C and by angles 38 and 39 and screws 38' and 39', respectively. The table top sections may have the usual dowel pins 40 and dowel pin openings 41, if desired (see Figures 1 and 2).

From the foregoing description of the various parts of my ball bearing equalizing table slide, the operation thereof may be readily understood. The slides are assembled in the manner previously explained. The slides will freely open and close due to the ball bearing connections disposed between adjacent slides. The equalizing gearing will cause the slides F and F' and the slides G and G' to move away or toward the central slide in endwise directions so that at all times the extended slides will be in perfect balance. The ball bearings prevent the slides from binding.

The construction of the slides cause the gearing and the ball bearings to be enclosed at all times for protection. No moving parts are outwardly visible. The racks are so arranged that the slides, when assembled, can be moved initially together and then they are held against disassembly by the stop blocks 28, which are placed in position after the intermediate and end slides are partially moved into closed position.

Figure 2:
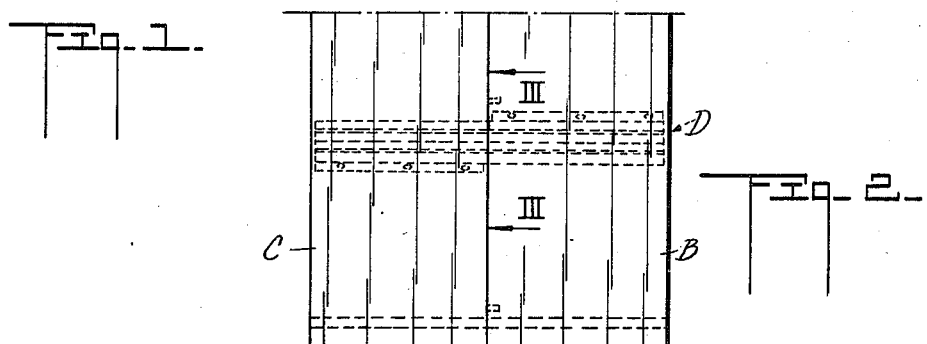
Figure 2 illustrates the same parts in a position with the leaves closed together.

Figure 2 illustrates the slides in closed position, and it will be noted that all of the slides are of uniform length and are arranged side by side so that the ends of the slides will lie flush with each other.

I have pointed out how the ball bearings and the gearing mechanism cooperate to prevent adjacent slides from contacting with each other, except through the ball bearings and the gear and rack mechanism. In addition to this, the screws 38' and 39' secure the angles 38 and 39 to the table top sections B and C in such a manner as to space the upper edges of the end slides a slight distance from the adjacent edges of the central slide in order to reduce friction between the parts. The angles 38 and 39 will have sufficient rigidity and can be extended far enough down on the end slides to cause the lower edges of these slides to be spaced from the adjacent edges of the central slide.

I claim:

1. An equalizing slide comprising a central slide having a top and bottom, an equalizing gear rotatably carried thereby and extending obliquely so that diametrically opposite portions of the gear will project from opposing sides of the slide and be disposed near the top and bottom of the slide, intermediate slides having tops and bottoms and being movable along both sides of the central slide and having racks meshing with the gear, the racks extending in opposite directions so that a movement of one intermediate slide in one direction with respect to the central slide will cause the other intermediate slide to move in the opposite direction, equalizing gears rotatably carried by the intermediate slides and extending at an angle so that diametrically-opposite portions of the gears will project from opposite sides of the slides and be disposed near the tops and bottoms of the slides, racks carried by the central slide and meshing with said last-named gears, end slides arranged adjacent to the intermediate slide gears and having racks meshing with the gears of the intermediate slides, the racks on the central and end slides being arranged for causing the end slides to move in opposite directions and at the same speed.

2. An equalizing table slide comprising a thin central slide having a top and bottom, an equalizing gear rotatably carried thereby and extending through the slide at an oblique angle so that portions project from opposite sides and are disposed near the slide top and bottom, intermediate thin slides having tops and bottoms and being arranged on opposite sides of the central slide and having racks meshing with the gear, obliquely inclined equalizing gears carried by the intermediate slides and projecting from opposite sides thereof, the extreme projecting portions of said second named gears being disposed near the tops and bottoms of the intermediate slides, racks on the central slide meshing with the intermediate slide gears, end slides paralleling the intermediate slides and carrying racks meshing with the intermediate slide gears, interconnecting means arranged along the tops and bottoms of adjacent slides for slidably connecting them together, said means also cooperating with the slides for housing the gears and racks.

3. In a device of the type described, a slide composed of two identical parts stamped out of sheet metal, each part having a web-like central section with a portion cut and bent at an angle to the plane of the web, the two parts being inverted with respect to each other and secured together for causing the bent out angle portions to provide a gear-receiving slot.

4. In combination, a thin central slide having inwardly facing channels at its top and bottom and along both sides, two thin intermediate slides disposed on opposite sides of the central slide and having outwardly facing channels at their tops and bottoms, two thin end slides arranged along the intermediate slides and having inwardly facing channels at their tops and bottoms and only along the sides disposed adjacent to the intermediate slides, interconnecting frictionless means provided in the compartments formed by the cooperating channels of the central and intermediate slides and by the cooperating channels of the intermediate and end slides for slidably connecting the adjacent slides together, large equalizing gearing carried by certain of the slides and being obliquely inclined so as to be enclosed by the cooperating channels and end slides, racks carried by the slides and meshing with the gears, and stops carried by certain slides and enclosed by the slides and their cooperating channels for limiting the movement of the slides into open and closed positions.

5. In combination, a thin central slide made of two identical halves placed back to back, the completed slide having inwardly facing channels at its top and bottom and along both sides, two thin intermediate slides, each having two identical halves placed back to back, the intermediate slides being disposed on opposite sides of the central slide and having outwardly facing channels at their tops and bottoms, two thin end slides arranged along the intermediate slides and having inwardly facing channels at their tops and bottoms and only along the sides disposed adjacent to the intermediate slides, ball bearings provided in the compartments formed by the cooperating channels of the central and intermediate slides and by the cooperating channels of the intermediate and end slides for slidably connecting the adjacent slides together, large equalizing gearing carried by the central and intermediate slides and being obliquely inclined so as to lie within the spaces provided between the slides, said gearing being enclosed by the walls of the slides and the channels, and racks carried by the slides and meshing with the gears.

6. A compact and narrow ball bearing equalizing slide comprising a central slide with pairs of inwardly facing channels arranged on both sides of the slide, two intermediate slides disposed on both sides of the central slide and having outwardly facing channels cooperating with the inwardly facing channels to form ball bearing receiving housings, an equalizing gear rotatably carried by the central slide and extending obliquely so that diametrically opposite portions of the gear will project from opposing sides of the slide and be disposed near the channels, racks carried by the intermediate slides and meshing with the gear, the racks extending in opposite directions so that a movement of one intermediate slide in one direction with respect to the central slide will cause the other intermediate slide to move in the opposite direction, equalizing gears rotatably carried by the intermediate slides and extending at an oblique angle so that diametrically oposite portions of the gears will project from opposite sides of the slides, racks carried by the central slide and meshing with said last named gears, end slides having inwardly extending channels cooperating with the intermediate outwardly facing channels to form ball receiving housings, racks on the end slides meshing with the gears on the intermediate slides, said racks and gears preventing the lateral movement of the slides toward each other, and ball bearings received in the housings for frictionlessly interconnecting the slides and preventing lateral movement of the slides away from each other.

7. A compact and narrow ball bearing equalizing slide comprising a central slide with pairs of inwardly facing channels arranged on both sides of the slide, two intermediate slides disposed on both sides of the central slide and having outwardly facing channels cooperating with the inwardly facing channels to form ball bearing receiving housings that are square in cross section, an obliquely extending equalizing gear rotatably carried by the central slide so that diametrically opposite portions will project from opposing sides, racks carried by the intermediate slides and meshing with the gear, obliquely inclined equalizing gears rotatably carried by the intermediate slides and extending beyond both sides of the intermediate slides, racks carried by the central slide and meshing with said last named gears, end slides having inwardly extending channels cooperating with the intermediate outwardly facing channels to form ball bearing receiving housings that are square in cross section, racks on the end slides meshing with the gears on the intermediate slides, and ball bearings in the housings and contacting with all four walls of the housings to prevent lateral movement between the slides while permitting longitudinal movement, the ball bearings cooperating with the housings for maintaining the slides in a horizontal plane whether the slides are extended or contracted.

8. A compact and narrow ball bearing equalizing slide comprising a central slide with pairs of inwardly facing channels arranged on both sides of the slide, two intermediate slides disposed on both sides of the central slide and having outwardly facing channels cooperating with the inwardly facing channels to form ball bearing receiving housings that are square in cross section, an obliquely extending equalizing gear rotatably carried by the central slide so that diametrically opposite portions will project from opposing sides, racks carried by the intermediate slides and meshing with the gear, obliquely inclined equalizing gears rotatably carried by the intermediate slides and extending beyond both sides of the intermediate slides, racks carried by the central slide and meshing with said last named gears, end slides having inwardly extending channels cooperating with the intermediate outwardly facing channels to form ball bearing receiving housings that are square in cross section, racks on the end slides meshing with the gears on the intermediate slides, and ball bearings in the housings and contacting with all four walls of the housings to prevent lateral movement between the slides while permitting longitudinal movement, the ball bearings cooperating with the housings for maintaining the slides in a horizontal plane whether the slides are extended or contracted, spaced stop pins carried by at least one of the end slides, and a cooperating stop pin carried by the intermediate slide disposed adjacent to the end slide carrying the first named stop pins and movable between the two stop pins for limiting the opening and closing movements of the slides.

WILLIAM M. HYLAND.